United States Patent [19]

Greaves et al.

[11] Patent Number: 4,656,507

[45] Date of Patent: Apr. 7, 1987

[54] QUAD-EDGE VIDEO SIGNAL DETECTOR

[75] Inventors: John O. B. Greaves; David J. Warrender, both of Sebastopol, Calif.

[73] Assignee: Motion Analysis Systems, Inc., Santa Rosa, Calif.

[21] Appl. No.: 598,827

[22] Filed: Apr. 10, 1984

[51] Int. Cl.[4] .................. H04N 7/00; H04N 5/262
[52] U.S. Cl. .................... 358/96; 358/183; 358/166; 340/728; 382/22
[58] Field of Search .............. 358/166, 96, 183, 182, 358/284; 340/728, 727, 747; 382/22, 54, 8

[56] References Cited

U.S. PATENT DOCUMENTS

| | | | |
|---|---|---|---|
| 3,980,870 | 9/1976 | Kawahara | 382/22 X |
| 4,258,394 | 3/1981 | Kennedy | 358/96 X |
| 4,300,122 | 11/1981 | McMahon | 382/22 X |
| 4,442,542 | 4/1984 | Lin et al. | 382/8 |
| 4,463,381 | 7/1984 | Powell et al. | 358/166 |
| 4,546,385 | 10/1985 | Anastassiou | 358/96 X |
| 4,581,631 | 4/1986 | Sonnenberger | 358/166 X |

*Primary Examiner*—James J. Groody
*Assistant Examiner*—E. Anne Toth
*Attorney, Agent, or Firm*—Flehr, Hohbach, Test, Albritton & Herbert

[57] ABSTRACT

Apparatus and method for processing a raster scan video signal representing an image and detecting the outline of one or more objects in the image represented by the video signal. The steps of the method include encoding the raster scan video signal as a sequence of binary pixel values. For each of a plurality of the pixels the following steps are performed. It is detected when the binary pixel values representing the pixel and a horizontally adjacent pixel are distinct. It is also detected when both (a) the binary pixel values representing the pixel and a vertically adjacent pixel are distinct, and (b) the binary pixel values representing a pixel horizontally adjacent to said pixel and a pixel vertically adjacent thereto are distinct. The position of the pixel is reported when either of the detecting steps detects distinct binary pixel values. The second detecting step automatically eliminates redundant pixel reporting by eliminating the reporting of double diagonal pixels.

16 Claims, 8 Drawing Figures

QUAD-EDGE VIDEO SIGNAL DETECTOR

The present invention relates generally to video signal processing systems and in particular to an apparatus and method for detecting the outline of one or more objects in an image represented by a raster scan video signal.

In a variety of motion analysis systems it is useful to process video signals representing successive images of the motion being analyzed. In some such systems, the general method used is to reduce the video signal for each frame into a set of values representing the centroid of each object in the image. An initial step in some such methods is to detect the outline of each object in the image. The present invention provides an improved method of detecting the outline of objects in an image represented by a raster scan video signal.

Prior art video image outline detectors known to the inventors use two methods of detecting the outline of objects. First, in the "brute force" method, the entire image of each frame is digitized and then differences in adjacent pixels are detected by successive sweeps through the stored data. This first method is not amenable to real time signal processing by microcomputers due to the quantity of calculations required. Second, in the predecessor to the present invention, the image is encoded as a sequence of binary values as it is received, and only the positions of adjacent pixels within a raster scan line having distinct values is stored for later processing. The positions of these selected pixels form an incomplete outline of each object since horizontal edges are not detected. While such an incomplete outline can often be used to obtain a reasonable estimate of the centroid and other visual characteristics of each object in the image, the inaccuracies introduced are often sufficient to impair the reliability of the motion studies produced using the resulting data.

Regardless of the method of detecting the outline of the objects in the image represented by the raster scan video signal, the outline data is then used to calculate the centroid, stick figure, or other characteristic of each object in the image, and then the change in the position of the centroids or other spatially related components over time is used to analyze the motion of the objects.

It is therefore a primary object of the present invention to provided an improved method and system for detecting the outline of one or more objects in an image represented by a raster scan video signal.

Another object of the present invention is to provide an outline detection method and system which facilitates real time motion analysis of objects represented by video images.

Still another object of the present invention is to provide an outline detection method and system which detects both horizontal and vertical edges and eliminates redundant reporting of the outline along diagonal portions of the outline.

In summary, the method of the invention is a method of processing a raster scan video signal representing an image and detecting the outline of one or more objects in the image represented by the video signal. The steps of the method include encoding the raster scan video signal as a sequence of binary pixel values. Each binary pixel value represents one pixel of the image. For each of a plurality of the pixels the following steps are performed. It is detected when the binary pixel values representing the pixel and a horizontally adjacent pixel are distinct. It is also detected when both (a) the binary pixel values representing the pixel and a vertically adjacent pixel are distinct, and (b) the binary pixel values representing a pixel horizontally adjacent to said pixel and a pixel vertically adjacent thereto are distinct. The position of the pixel is reported when either of the detecting steps detects distinct binary pixel values. The second detecting step eliminates redundant pixel reporting by eliminating the reporting of double diagonal pixels.

The apparatus of the invention comprises a system for processing a raster scan video signal representing an image and detecting the outline of one or more objects in the image represented by the video signal. The apparatus includes means for quantizing the video signal, means for detecting vertical edges in the quantized image, means for detecting horizontal edges in the quantized image, and means for eliminating or preventing redundant reports of pixels along the outline of the objects in the image.

Additional objects and features of the invention will be more readily apparent from the following detailed description and appended claims when taken in conjunction with the drawings, in which:

Figure 1:
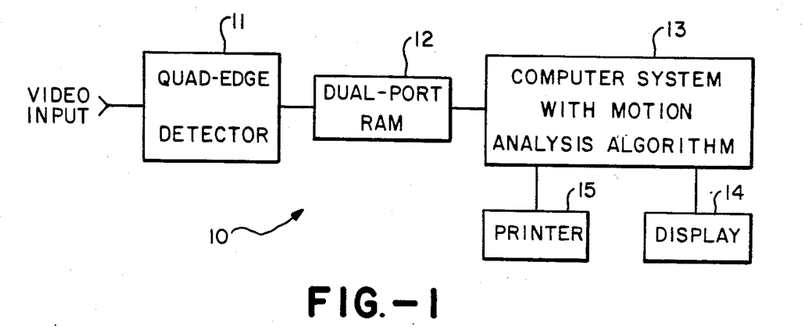
FIG. 1 depicts a block diagram of a motion analysis system using an outline detector in accordance with the current invention.

Referring to FIG. 1, a motion analysis system 10 in accordance with the invention includes an edge detector 11 for processing a video signal, a dual-ported memory 12 for storing the outlines of the objects in each frame of the video image, a computer system 13 with motion analysis algorithms for processing the outline information stored in the memory 12, and a display 14 and a printer 15 for displaying and printing the results of the motion analysis.

Figure 2:
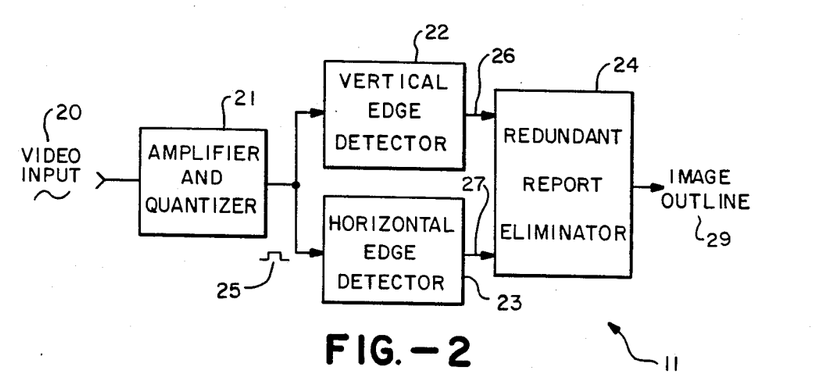
FIG. 2 depicts a block diagram of an outline detector in accordance with the current invention.

Referring to FIG. 2, a quad-edge video detector 11 in accordance with the invention includes the following components. An amplifier/quantizer 21 is used to convert the analog video input signal 20 into a binary signal 25 for each pixel. It is assumed that the video input signal 20 is an analog signal generated by a standard (i.e., 525 line) raster scan video camera. However a lower or higher resolution raster scan video camera could easily be accommodated. The threshold video value used to separate light pixels (having a binary value of 1) from dark pixels (having a binary value of 0) is selected to be an appropriate value so that transitions from light to dark pixels and vice versa generally mark the outlines of objects in the video image represented by the video input signal 20.

For the purposes herein, a horizontal edge of an object is defined as a set of points along the edge of the object which are distinct from the vertically adjacent points just outside the object. In other words a horizontal edge separates visually distinguishable regions above and below the horizontal edge. Similarly, a vertical edge of an object is defined as a set of points along the edge of the object which are distinct from the horizontally adjacent points just outside the object. A vertical edge separates visually distinguishable regions to the left and right of the vertical edge. A diagonal edge of an object comprises a set of points along the edge of the object which are distinct from both the vertically and horizontally adjacent points just outside the object.

A vertical edge detector 22 compares each binary signal with the binary value of the previous pixel on the same horizontal scan line. This process is performed in real time as the video input signal 20 is received by the quad-edge detector 11. Accordingly, the last pixel received and currently being analyzed is called the "current" pixel. If the binary values of horizontally adjacent pixels are different, the vertical edge detector 22 generates a signal 26 indicating that the coordinates of the current pixel are to be reported, as explained below.

A horizontal edge detector 23 compares each binary signal with the binary value of the pixel at the same horizontal position but above and vertically adjacent to the current pixel. Generally this requires storing the binary value of each pixel in the scan line prior to the current scan line. If the binary values of vertically adjacent pixels are different, the horizontal edge detector 23 generates a signal 27 indicating that the coordinates of the current pixel are to be reported.

The set of all the coordinates so reported forms the outline of each object in the video image represented by the video input signal 20. However, the set of pixels so reported contains a significant amount of redundant data. This redundant data not only includes doubly reported pixels, but also an excessive number of pixels along diagonal edges. The doubly reported pixel problem is easily solved merely by OR'ing the output of the horizontal and vertical edge detectors 22 and 23. But the latter problem, herein called the double diagonal problem is harder to solve.

Figure 4:
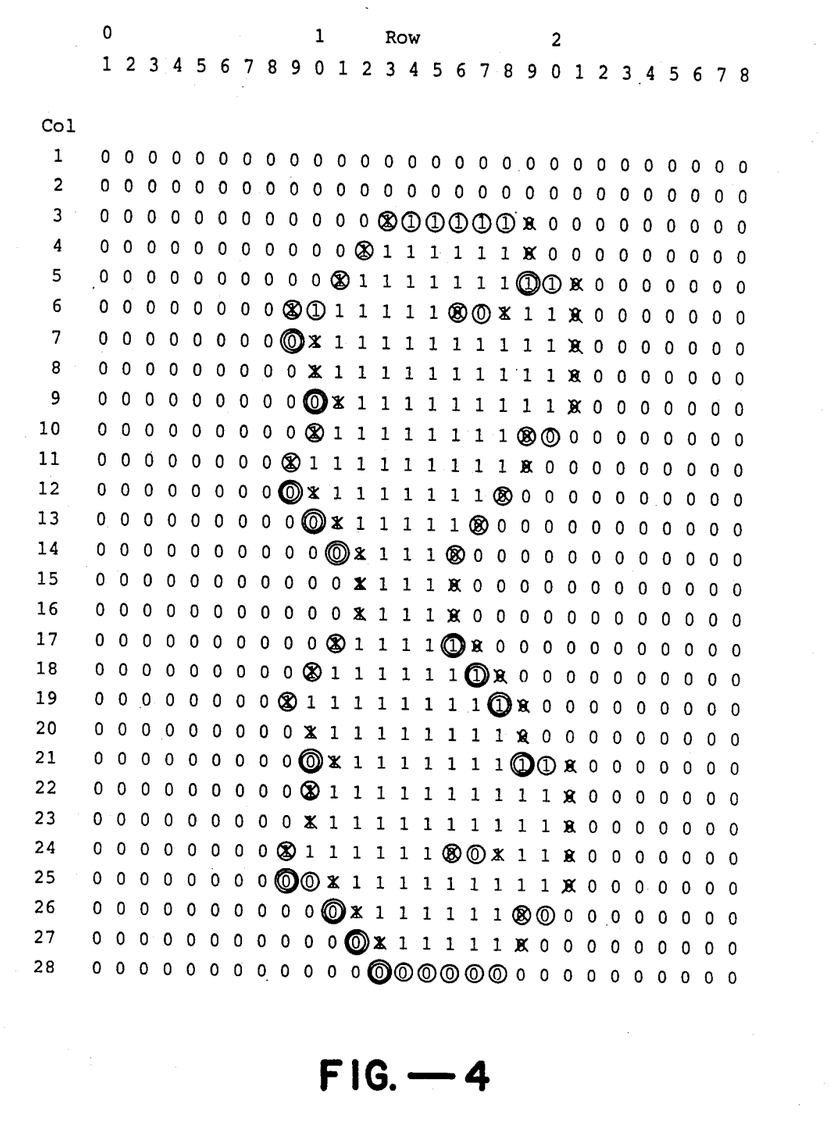
FIG. 4 depicts a portion of a digitized video image.

See FIG. 4 for an example of a portion of a digitized video image showing both doubly reported pixels and double diagonal pixels. Pixels with a circle around them represent horizontal edge pixels; pixels with an X through them represent vertical edge pixels; and pixels with a double circle around them represent double diagonal pixels which are not reported because they are redundant.

It is assumed for purposes of this discussion that the motion analysis system 10 computes the centroids of the objects in the video image by finding the mathematical average of the horizontal and vertical coordinates of the pixels forming the outline of each object. The use of other methods or variations on this method, or the use of the outline data to compute other visual characteristics, however, are of no particular significance to the invention and do not reduce its usefulness.

Failure to eliminate double diagonal pixels causes at least two types of problems. First, more memory is required to store the outline data generated than if the double diagonal pixels were eliminated. Second the presence of double diagonal pixels tends to introduce errors in calculating the centroid or other characteristic of an object in the video image because certain portions of the outline of the object are given more weight than they should be given.

To eliminate both doubly reported pixels and double diagonal pixels there is provided a special redundant report eliminator 24. This not only OR's the output of the two edge detectors, but it also eliminates double diagonal pixels as follows. The basic method of eliminating double pixels is to report a pixel as a horizontal edge pixel only when both the current pixel and the prior pixel are both distinct from their corresponding vertically adjacent pixels. To see that this method in fact eliminates double diagonal pixels one need only consider the example shown in FIG. 4.

Figure 3:
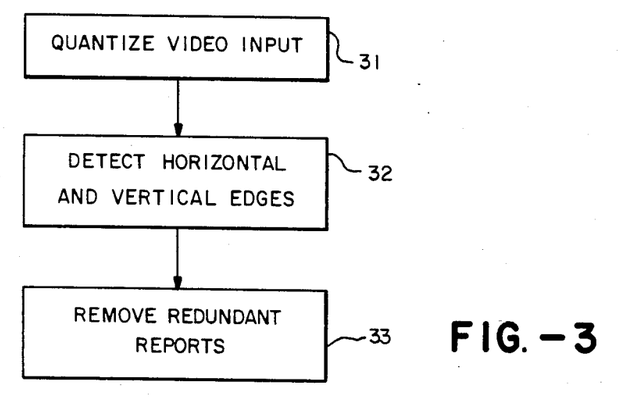
FIG. 3 depicts of flow chart of the method of the current invention.

Referring to FIG. 3, the method of the invention is a method for detecting the outline of one or more objects in an image represented by a raster scan video signal. The steps of the method are to (1) quantize the video input signal 31, (2) detect the horizontal and vertical edges of objects in the video image 32, and (3) remove redundant reports of pixels along the outline of the object or objects in the image 33. The apparatus depicted in FIGS. 5, 6, and 8 shows how this method can be implemented.

Figure 5:
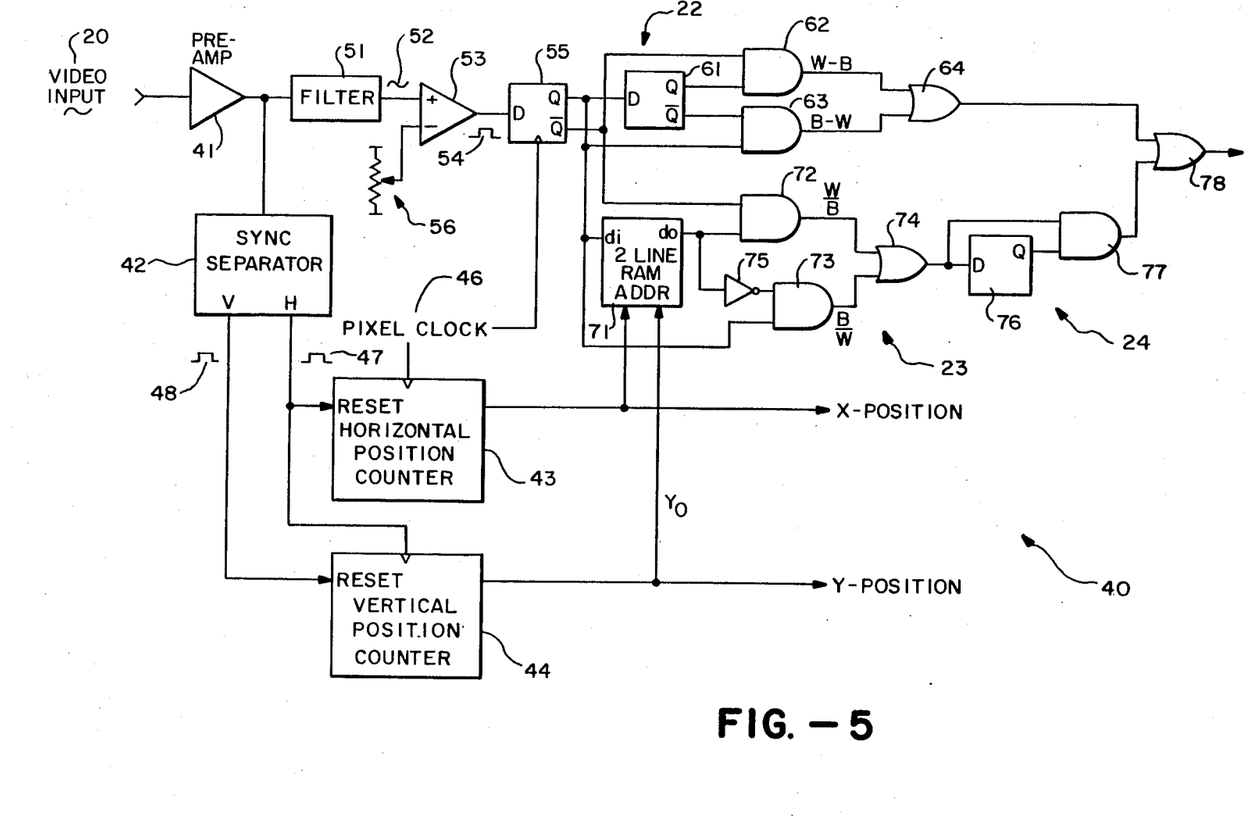
FIG. 5 depicts a block diagram of one embodiment of an outline detector in accordance with the current invention.
Figures 6, 7:
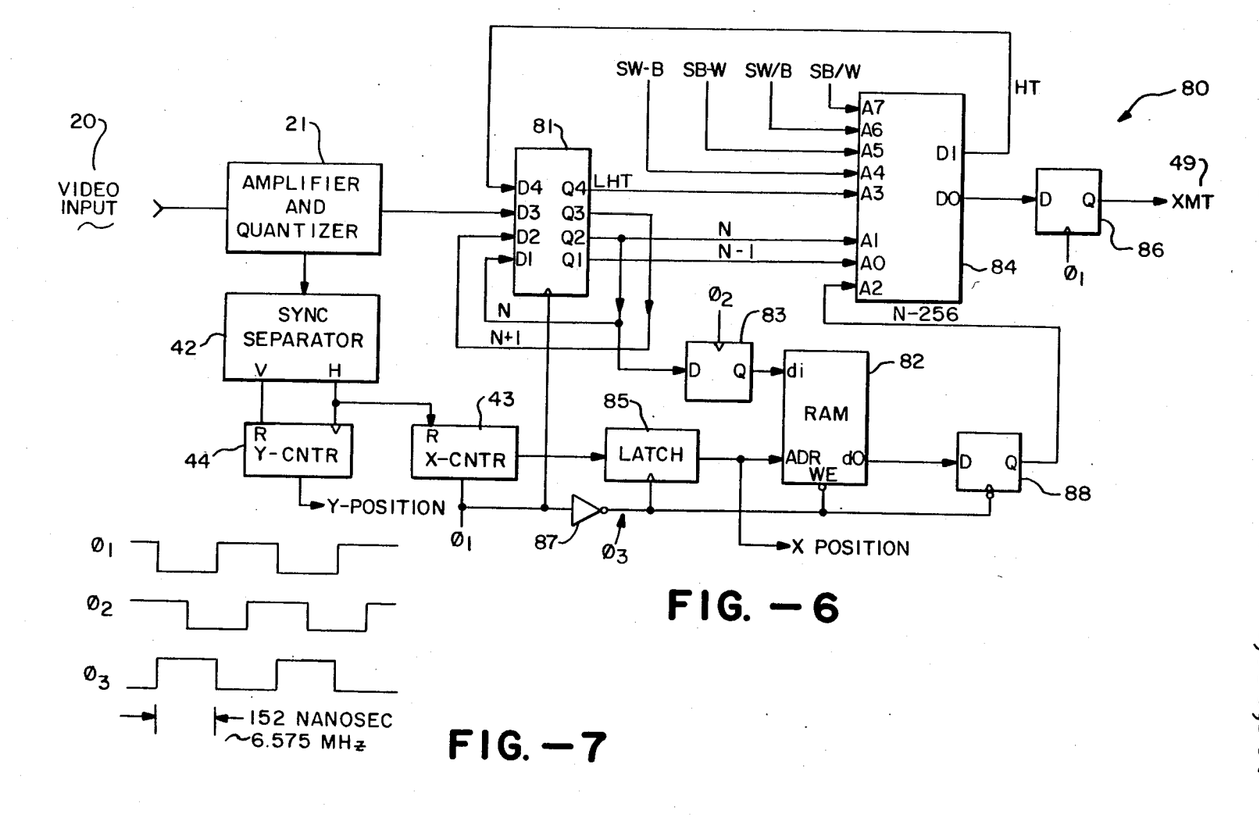
FIG. 6 depicts a block diagram of a second embodiment of an outline detector in accordance with the current invention.
FIG. 7 depicts a timing diagram of certain clock signals used in the outline detector shown in FIG. 6.

Referring to FIG. 5, there is shown one embodiment of the apparatus of the invention. The quad-edge detector 40 in this embodiment uses a sync separator 42 and two counters 43-44 to determine the x-y position of the current pixel in the video image. Without any limitation on the invention, it is assumed for the purposes of this discussion that when a pixel is reported by the system 11 as being an outline pixel, the x-y position of the pixel is recorded in a memory 12 for later analysis by a computer system 13. However, the output signal 49 could be used for other purposes such as a input signal to a video monitor showing the outlines of the objects in the original video input signal 20.

Figure 8:
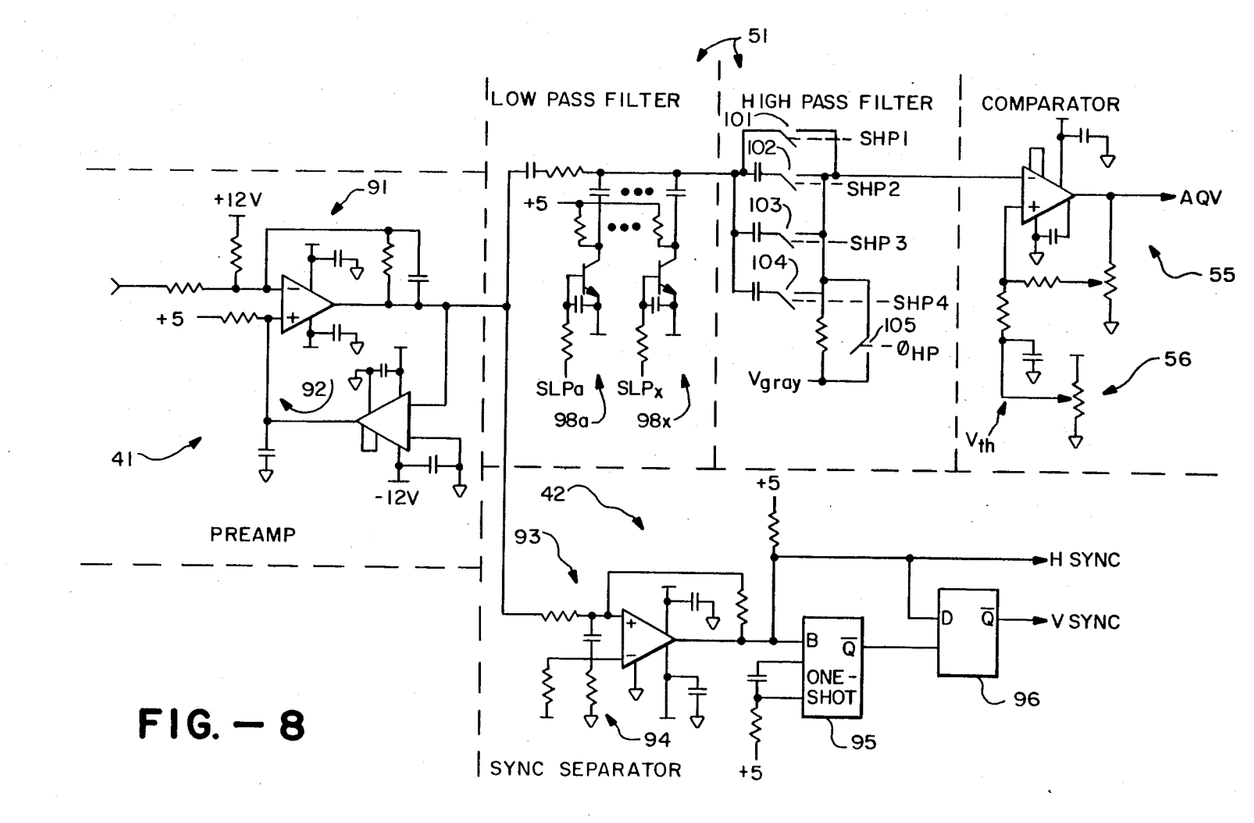
FIG. 8 depicts a circuit diagram of an amplifier, filter-,and sync separator in accordance with the current invention.

One embodiment of a sync separator 42 is shown in FIG. 8. A sync separator separates out from a raster scan video signal the vertical and horizontal synchronization pulses embedded therein.

The horizontal position counter 43 is incremented by a pixel clock signal 46 (denoted $\phi_1$ in FIG. 6) which clocks the counter 43 at a rate of approximately 6.575 Mhz. This frequency is chosen to accommodate a 525 line image with a one-to-one aspect ratio. The horizontal counter 43 is reset by signals derived from the horizontal sync pulse 47. The vertical position counter 44 is incremented by signals derived from each horizontal sync pulse 47 and is reset by signals derived from the vertical sync pulse 48.

A preamp 41 boosts the video input 20 before the signal is processed by the system 40. Then a filter 51 filters out certain undesirable elements of the video input 20. The filter 51 in the preferred embodiment comprises a low pass filter followed by a high pass filter with a special gating mechanism for filtering out (i.e., disregarding) the portion of the video signal 20 occurring during the vertical and horizontal blanking periods.

The filtered signal 52 is quantized by a comparator 53 which compares the filtered signal 52 with a threshold voltage generated by adjustable threshold voltage circuit 56. Thus the output of the comparator 53 will be positive (i.e., a binary 1) when the filtered video signal 53 exceeds the threshold voltage and zero or negative (i.e., a binary 0) when the filtered video signal 53 falls below the threshold voltage. The binary value of the quantized signal 54 is stored in a flip-flop 55.

The vertical edge detector 22 comprises a flip-flop 61, two AND gates 62 and 63, and an OR gate 64. The flip-flop 61 retains the binary value of the previous (horizontally adjacent) pixel, which is "compared" with the value of the current pixel by the two AND gates 62 and 63. If the binary values of the previous pixel and current pixel are 0 and 1, respectively, the current pixel falls on a black-white (denoted B-W) boundary of an object in the video image; if the values are 1 and 0, respectively, the current pixel falls on a white-black (denoted W-B) boundary of an object in the video image. The output of OR gate 64, which OR's the outputs of the two AND gates, reports the presence or absence of a vertical edge.

The horizontal edge detector 23 comprises a two-line memory 71, two AND gates 72 and 73, an OR gate 74, and an inverter 75. The two-line memory 71 retains the binary values of the previous scan line of pixels as well the binary values of the current scan line of pixels. In one preferred embodiment, the memory 71 comprises two one-line memory buffers (not shown), each holding 256 binary values. As will be understood by those skilled in the art, the least significant bit of the y-count, $y_0$, indicates which one line buffer is to be used for storing the current pixel value and which buffer holds the pixel values from the previous scan line. Each time the y-count is incremented the roles of the two one-line buffers are switched. The current one-line buffer becomes the last-scan-line buffer, and vice versa.

The memory 71 is addressed by the x-count and the least significant bit of the y-count. The x-count indicates the position or address in the current one-line buffer that the current pixel should be stored in; it also indicates which address of the last-scan-line buffer should be read for comparison with the value of the current pixel. This "comparison" is performed by the two AND gates 72 and 73. The output of the memory, indicating the value of the pixel vertically adjacent to the current pixel in the previous scan line, is inverted by inverter 75 before being input to AND gate 73. (Note that the inverter 75 is needed because memory chips generally do not have complementary outputs.) If the binary values of the vertically adjacent pixel and the current pixel are 0 and 1, respectively, the current pixel falls on a black/white (denoted B/W) boundary of an object in the video image; if the values are 1 and 0, respectively, the current pixel falls on a white/black (denoted W/B) boundary of an object in the video image. The output of OR gate 74, which OR's the outputs of the two AND gates, reports the presence or absence of a horizontal edge.

The redundant report eliminator 24 includes a flip-flop 76, an AND gate 77, and an OR gate 78. The flip-flop 76 stores the output of the horizontal edge detector 23 from the previous pixel cycle. This output of the horizontal edge detector 23 is sometimes called herein the "horizontal take" and the output of the flip-flop 76 is sometimes called the "last horizontal take". Only if both the current horizontal take and the last horizontal take are both positive does the AND gate 77 produces a positive report. This eliminates double diagonal reports, as can be seen by referring to the example shown in FIG. 4. The output of the double diagonal eliminator circuit 76–77 and the output of the vertical edge detector 22 are OR'ed by OR gate 78, thereby eliminating double reports of outline pixels. A positive output from OR gate 78 indicates that the current pixel is along the outline of an object in the video image.

Referring to FIG. 6, there is shown a second embodiment 80 of the apparatus of the invention with a different architecture from the first embodiment but which produces equivalent results. Much like the first embodiment, shown in FIG. 5, the apparatus 80 includes an amplifier and quantizer 21, a sync separator 42, a horizontal position counter 43 (also called an x-counter) which is incremented by a pixel clock, herein called $\phi_1$, and a vertical position counter 44 (also called a y-counter) which is incremented by a signal derived from the horizontal sync signal. A four-bit latch 81 replaces three of the flip-flops in the embodiment shown in FIG. 5: latch input/output D3/Q3 corresponds roughly to flip-flop 55; latch input/output D1/Q1 corresponds to flip-flop 61; and latch input/output D4/Q4 corresponds to flip-flop 76. Random access memory (RAM) 82 in conjunction with flip-flops 83 and 88 comprise a one-line pixel buffer with a built in delay. Components 82, 83 and 88 correspond to the two-line memory 71 in FIG. 5. Finally, read only memory (ROM) 84 replaces AND gates 62, 63, 72, 73 and 77, inverter 75, and OR gates 64, 74 and 78. Note that components 82, 83 and 88 could be used in place of the two line memory 71 in the circuit 40 depicted in FIG. 5, thereby reducing the amount of random access memory needed in that circuit.

The apparatus 80 shown in FIG. 6 works as follows. The basic idea is that ROM 84 holds a truth table equivalent to the boolean algebra function performed by the AND and OR gates in the first embodiment 40. The inputs to both circuits 40 and 80 comprise: the binary value of the current pixel (also called pixel N), the binary value of the previous pixel (called pixel N−1), the binary value of the vertically adjacent pixel from the previous scan line (called pixel N−256), and the last horizontal take (called LHT)—i.e., the presence or absence of a horizontal edge in the previous pixel cycle. The outputs of both circuits are an "edge detected" signal (output D0 from ROM 84, called XMT after one clock delay, in FIG. 6) and the horizontal take (output D1 from ROM 84, called HT), which indicates whether the current pixel is on a horizontal edge (i.e., whether the current pixel has a different binary value than the vertically adjacent pixel). Note that the number of pixels per line, which is 256 in the preferred embodiment, is a function only of arbitrary choices and is of no particular importance to the invention.

In addition to the input signals just described, the ROM 84 has four other input signals denoted SW-B, SB-W, SW/B and SB/W. These signals correspond to four option selection switches: if the switch is on, detection of the corresponding edge is enabled, otherwise detection of the corresponding edge is disabled. An equivalent feature could be incorporated in circuit 40 by including an enable input for each AND gate 62, 63, 72 and 73 and connecting the switch signals as follows: SW-B to AND gate 62, SB-W to AND gate 63, SW/B to AND gate 72, and SB/W to AND gate 73.

A representative subset of the truth table in ROM 84 is shown in Tables 1A–1C. The remaining portion of this table can easily be generated by anyone of ordinary skill in the art. The ROM 84 as shown is 256 by 2 bits in size. An implementation that didn't use the four switches would require a ROM only 16 by 2 bits in size.

Referring to the timing diagram of FIG. 7, three clock signals are used in the apparatus 80. $\phi_1$, the pixel clock, signals latch 81 when to latch incoming pixels and certain other binary values, as explained below. $\phi_2$ is one-quarter phase (i.e., 90°) delayed from $\phi_1$ and is used with flip-flop 83 to delay the transfer of the value of pixel N to RAM 82 until the value of pixel N−256 (i.e., the pixel in the previous scan line which is vertically adjacent to pixel N), which is stored at the same memory address as pixel N, is written into flip-flop 88. $\phi_3$ is the inverse of $\phi_1$ (i.e., 180° delayed from $\phi_1$) and is used with latch 85 to delay the application of the current x-counter value to the RAM 82 by one-half clock cycle. All the clocks have a period of about 152 nanoseconds, which corresponds to a frequency of about 6.575 Mhz. As known by those skilled in the art, such clock signals can be easily generated using a 26.3 Mhz crystal clock and two J-K flip-flop connected in a ring, both using the 26.3 Mhz clock as a transition clock, or by using any one of a large number of equivalent multiphase clock circuits.

As used in this discussion, pixel N refers to the binary value of the Nth pixel on the current scan line, where the first pixel in each scan line has a value of N equal to 0.

Still referring to FIGS. 6 and 7, each time $\phi_1$ has an up transistion, a new pixel is latched into bit 3 of latch 81. Also, the pixel formerly in bit 3 is latched into bit 2, and the pixel formerly in bit 2 is latched into bit 1. The value currently in bit 3 is denoted pixel N+1, the value in bit 2 is denoted pixel N, and the value in bit 1 is denoted pixel N−1. Pixel N is considered to be the "current pixel" for purposes of the discussion of circuit 10, even though it is in fact one pixel cycle delayed from the video input signal 20. Furthermore, the horizontal take HT from the previous pixel cycle is latched into bit 4 upon the up transition of $\phi_1$, becoming the last horizontal take LHT. In this manner, latch 81 provides a time delay mechanism.

Also upon the up transition of $\phi_1$, the binary value of pixel N−256 is latched into flip-flop 88 (by the substantially simultaneous down transition of $\phi_3$) and the x-counter 43 is incremented.

Upon the up transition of $\phi_2$ the binary value of pixel N (which was pixel N+1 in the previous pixel cycle and was just latched into latch 81 by clock $\phi_1$ one-quarter clock cycle ago) is latched into flip-flop 83. Upon the up transition of $\phi_3$ (which happens one-quarter clock cycle—about 38 nanoseconds—after the up transition of $\phi_2$) the value of the x-counter is latched into latch 85 and applied to the address of RAM 82. Upon the down transition of $\phi_3$ (which happens at the beginning of the next pixel cycle when $\phi_1$ has an up transition) pixel N−256 is transferred from RAM 82 (from the address latched into latch 85) into flip-flop 88. This accomplishes the read portion of the read/write cycle. While the clock $\phi_3$ is low the pixel N, which is in flip-flop 83, is written into the RAM 82 at the address in latch 85. The write cycle ends upon the rise of clock $\phi_3$, which is the same time that the next address from the x-counter is loaded into latch 85 for the next cycle. The key to the correct operation of the single line RAM 82 in this read/write cycle is that the address latch 85, the RAM 82 write enable, and the data out of flip-flop 88 are physically connected to the same clock line with no possible skew between them. This assures positive timing margins.

The D0 output of ROM 84, which indicates whether the current pixel is to be reported as an outline pixel, is latched into flip-flop 86 at the beginning of each new pixel period. This provides a stable XMT signal for use by a motion analysis system 10. Upon the occurrence of an XMT signal, the value of the x-counter stored in latch 85 will remain stable for one-half clock cycle (i.e., about 76 nanoseconds) and can be written into a memory 12. Similarly, the value of the y-counter, which is stable throughout the processing of each scan line, can be written into memory 12.

Since the x-counter 43 is reset to zero during each horizontal blanking period, the address value used to store pixel N in the RAM will be N+2. Furthermore, since the horizontal position or address of all pixels is displaced by the same amount, this shifting of the video outline by two pixels to the right is of no consequence. The analysis of the motion of the objects represented by the outlines generated by this circuit 80 will not be affected by this coordinate translation because motion concerns only the quantity and direction of changes in position over time, not the absolute position of any object.

Referring to FIG. 8, there is shown one embodiment of a preamp 41, a sync separator 42, a tunable low and high pass filter 51, and a comparator 55 with a adjustable threshold voltage circuit 56. The preamp 41 uses a standard amplifier circuit 91 with a feedback loop 92 for restoring the DC level of the amplified signal. The sync separator 42 is a standard circuit using an RC filter 93 and an amplifier 94 to generate an HSYNC signal. A one-shot 95 and a flip-flop 96 generate a VSYNC signal which is based on sampling the composite sync signal. The one-shot 95, which is triggered by the HSYNC signal, provides a delayed clock for flip-flop 96 which performs the sampling to generate the vertical sync signal. The time delay is determined by the one-shot 95 and is about 12 microseconds in this embodiment.

The tunable low pass filter 97 comprises several parallel RC filters. The RC filters to be used are selectable with switches 98a–98x controlled by signals SLPa–SLPx (e.g., from the front panel of a device incorporating the system 11).

The high pass filter comprises a selected capacitor and a resistor tied to a reference voltage, Vgray, which approximates the average background intensity of the filtered signal. Switches 101–104 are controlled by signals SHP1–SHP4 for selecting the capacitor, if any, which is used. If the switch 101 (controlled by signal SHP1) is closed, the high pass filter is short circuited. The other switches 102–104 can be used to select the RC characteristics of the high pass filter. Furthermore, switch 105 controlled by a control signal denoted $\phi_{HB}$ is kept open when an active video signal is being received and is closed (thereby short-circuiting the resistor) during horizontal blanking. This prevents the selected capacitor from getting charged up during blanking and thereby disrupting the normal operation of the circuit. It also ensures that the selected capacitor will be precharged to the background video voltage level (i.e., Vgray).

The comparator 55 and adjustable threshold voltage circuit 56 are standard circuit components. The output signal, denoted AQV, is the binary value of the current pixel.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For instance, the use of a raster scan video signal going from right to left instead of left to right, or going from bottom to top instead of top to bottom, is an insignificant variation. Other insignificant variations include (1) processing only every other pixel (e.g., to facilitate real time processing with slow circuitry) wherein consecutively processed pixels rather than truly "adjacent" pixels are compared for edge detection purposes; and (2) the elimination of a filter or preamp in the pixel quantizer.

TABLE 1

| Adr | Address Input Values | | | | | | | | Output | |
|---|---|---|---|---|---|---|---|---|---|---|
| | SW-B A7 | SB-W A6 | SW/B A5 | SB/W A4 | LHT A3 | N-256 A2 | N A1 | N-1 A0 | HT D1 | XMT D0 |
| F0 | 1 | 1 | 1 | 1 | 0 | 0 | 0 | 0 | 0 | 0 |
| F1 | 1 | 1 | 1 | 1 | 0 | 0 | 0 | 1 | 0 | 1 |
| F2 | 1 | 1 | 1 | 1 | 0 | 0 | 1 | 0 | 1 | 1 |
| F3 | 1 | 1 | 1 | 1 | 0 | 0 | 1 | 1 | 1 | 0 |
| F4 | 1 | 1 | 1 | 1 | 0 | 1 | 0 | 0 | 1 | 0 |
| F5 | 1 | 1 | 1 | 1 | 0 | 1 | 0 | 1 | 1 | 1 |
| F6 | 1 | 1 | 1 | 1 | 0 | 1 | 1 | 0 | 0 | 1 |
| F7 | 1 | 1 | 1 | 1 | 0 | 1 | 1 | 1 | 0 | 0 |
| F8 | 1 | 1 | 1 | 1 | 1 | 0 | 0 | 0 | 0 | 0 |
| F9 | 1 | 1 | 1 | 1 | 1 | 0 | 0 | 1 | 0 | 1 |
| FA | 1 | 1 | 1 | 1 | 1 | 0 | 1 | 0 | 1 | 1 |
| FB | 1 | 1 | 1 | 1 | 1 | 0 | 1 | 1 | 1 | 1 |
| FC | 1 | 1 | 1 | 1 | 1 | 1 | 0 | 0 | 1 | 1 |
| FD | 1 | 1 | 1 | 1 | 1 | 1 | 0 | 1 | 1 | 1 |
| FE | 1 | 1 | 1 | 1 | 1 | 1 | 1 | 0 | 0 | 1 |
| FF | 1 | 1 | 1 | 1 | 1 | 1 | 1 | 1 | 0 | 0 |
| E0 | 1 | 1 | 1 | 0 | 0 | 0 | 0 | 0 | 0 | 0 |
| E1 | 1 | 1 | 1 | 0 | 0 | 0 | 0 | 1 | 0 | 1 |
| E2 | 1 | 1 | 1 | 0 | 0 | 0 | 1 | 0 | 0 | 1 |
| E3 | 1 | 1 | 1 | 0 | 0 | 0 | 1 | 1 | 0 | 0 |
| E4 | 1 | 1 | 1 | 0 | 0 | 1 | 0 | 0 | 1 | 0 |
| E5 | 1 | 1 | 1 | 0 | 0 | 1 | 0 | 1 | 1 | 1 |
| E6 | 1 | 1 | 1 | 0 | 0 | 1 | 1 | 0 | 0 | 1 |
| E7 | 1 | 1 | 1 | 0 | 0 | 1 | 1 | 1 | 0 | 0 |
| E8 | 1 | 1 | 1 | 0 | 1 | 0 | 0 | 0 | 0 | 0 |
| E9 | 1 | 1 | 1 | 0 | 1 | 0 | 0 | 1 | 0 | 1 |
| EA | 1 | 1 | 1 | 0 | 1 | 0 | 1 | 0 | 0 | 1 |
| EB | 1 | 1 | 1 | 0 | 1 | 0 | 1 | 1 | 0 | 0 |
| EC | 1 | 1 | 1 | 0 | 1 | 1 | 0 | 0 | 1 | 1 |
| ED | 1 | 1 | 1 | 0 | 1 | 1 | 0 | 1 | 1 | 1 |
| EE | 1 | 1 | 1 | 0 | 1 | 1 | 1 | 0 | 0 | 1 |
| EF | 1 | 1 | 1 | 0 | 1 | 1 | 1 | 1 | 0 | 0 |
| D0 | 1 | 1 | 0 | 1 | 0 | 0 | 0 | 0 | 0 | 0 |
| D1 | 1 | 1 | 0 | 1 | 0 | 0 | 0 | 1 | 0 | 1 |
| D2 | 1 | 1 | 0 | 1 | 0 | 0 | 1 | 0 | 1 | 1 |
| D3 | 1 | 1 | 0 | 1 | 0 | 0 | 1 | 1 | 1 | 0 |
| D4 | 1 | 1 | 0 | 1 | 0 | 1 | 0 | 0 | 0 | 0 |
| D5 | 1 | 1 | 0 | 1 | 0 | 1 | 0 | 1 | 0 | 1 |
| D6 | 1 | 1 | 0 | 1 | 0 | 1 | 1 | 0 | 0 | 1 |
| D7 | 1 | 1 | 0 | 1 | 0 | 1 | 1 | 1 | 0 | 0 |
| D8 | 1 | 1 | 0 | 1 | 1 | 0 | 0 | 0 | 0 | 0 |
| D9 | 1 | 1 | 0 | 1 | 1 | 0 | 0 | 1 | 0 | 1 |
| DA | 1 | 1 | 0 | 1 | 1 | 0 | 1 | 0 | 1 | 1 |
| DB | 1 | 1 | 0 | 1 | 1 | 0 | 1 | 1 | 1 | 1 |
| DC | 1 | 1 | 0 | 1 | 1 | 1 | 0 | 0 | 0 | 0 |
| DD | 1 | 1 | 0 | 1 | 1 | 1 | 0 | 1 | 0 | 1 |
| DE | 1 | 1 | 0 | 1 | 1 | 1 | 1 | 0 | 0 | 1 |
| DF | 1 | 1 | 0 | 1 | 1 | 1 | 1 | 1 | 0 | 0 |
| C0 | 1 | 1 | 0 | 0 | 0 | 0 | 0 | 0 | 0 | 0 |
| C1 | 1 | 1 | 0 | 0 | 0 | 0 | 0 | 1 | 0 | 1 |
| C2 | 1 | 1 | 0 | 0 | 0 | 0 | 1 | 0 | 0 | 1 |
| C3 | 1 | 1 | 0 | 0 | 0 | 0 | 1 | 1 | 0 | 0 |
| C4 | 1 | 1 | 0 | 0 | 0 | 1 | 0 | 0 | 0 | 0 |
| C5 | 1 | 1 | 0 | 0 | 0 | 1 | 0 | 1 | 0 | 1 |
| C6 | 1 | 1 | 0 | 0 | 0 | 1 | 1 | 0 | 0 | 1 |
| C7 | 1 | 1 | 0 | 0 | 0 | 1 | 1 | 1 | 0 | 0 |
| C8 | 1 | 1 | 0 | 0 | 1 | 0 | 0 | 0 | 0 | 0 |
| C9 | 1 | 1 | 0 | 0 | 1 | 0 | 0 | 1 | 0 | 1 |
| CA | 1 | 1 | 0 | 0 | 1 | 0 | 1 | 0 | 0 | 1 |
| CB | 1 | 1 | 0 | 0 | 1 | 0 | 1 | 1 | 0 | 0 |
| CC | 1 | 1 | 0 | 0 | 1 | 1 | 0 | 0 | 0 | 0 |
| CD | 1 | 1 | 0 | 0 | 1 | 1 | 0 | 1 | 0 | 1 |
| CE | 1 | 1 | 0 | 0 | 1 | 1 | 1 | 0 | 0 | 1 |
| CF | 1 | 1 | 0 | 0 | 1 | 1 | 1 | 1 | 0 | 0 |
| B0 | 1 | 0 | 1 | 1 | 0 | 0 | 0 | 0 | 0 | 0 |
| B1 | 1 | 0 | 1 | 1 | 0 | 0 | 0 | 1 | 0 | 1 |
| B2 | 1 | 0 | 1 | 1 | 0 | 0 | 1 | 0 | 1 | 0 |
| B3 | 1 | 0 | 1 | 1 | 0 | 0 | 1 | 1 | 1 | 0 |
| B4 | 1 | 0 | 1 | 1 | 0 | 1 | 0 | 0 | 1 | 0 |
| B5 | 1 | 0 | 1 | 1 | 0 | 1 | 0 | 1 | 1 | 1 |
| B6 | 1 | 0 | 1 | 1 | 0 | 1 | 1 | 0 | 0 | 0 |
| B7 | 1 | 0 | 1 | 1 | 0 | 1 | 1 | 1 | 0 | 0 |
| B8 | 1 | 0 | 1 | 1 | 1 | 0 | 0 | 0 | 0 | 0 |
| B9 | 1 | 0 | 1 | 1 | 1 | 0 | 0 | 1 | 0 | 1 |

TABLE 1-continued

| Adr | Address Input Values | | | | | | | | Output | |
|---|---|---|---|---|---|---|---|---|---|---|
| | SW-B A7 | SB-W A6 | SW/B A5 | SB/W A4 | LHT A3 | N-256 A2 | N A1 | N-1 A0 | HT D1 | XMT D0 |
| BA | 1 | 0 | 1 | 1 | 1 | 0 | 1 | 0 | 1 | 1 |
| BB | 1 | 0 | 1 | 1 | 1 | 0 | 1 | 1 | 1 | 1 |
| BC | 1 | 0 | 1 | 1 | 1 | 1 | 0 | 0 | 1 | 1 |
| BD | 1 | 0 | 1 | 1 | 1 | 1 | 0 | 1 | 1 | 1 |
| BE | 1 | 0 | 1 | 1 | 1 | 1 | 1 | 0 | 0 | 0 |
| BF | 1 | 0 | 1 | 1 | 1 | 1 | 1 | 1 | 0 | 0 |
| 70 | 0 | 1 | 1 | 1 | 0 | 0 | 0 | 0 | 0 | 0 |
| 71 | 0 | 1 | 1 | 1 | 0 | 0 | 0 | 1 | 0 | 0 |
| 72 | 0 | 1 | 1 | 1 | 0 | 0 | 1 | 0 | 1 | 1 |
| 73 | 0 | 1 | 1 | 1 | 0 | 0 | 1 | 1 | 1 | 0 |
| 74 | 0 | 1 | 1 | 1 | 0 | 1 | 0 | 0 | 1 | 0 |
| 75 | 0 | 1 | 1 | 1 | 0 | 1 | 0 | 1 | 1 | 0 |
| 76 | 0 | 1 | 1 | 1 | 0 | 1 | 1 | 0 | 0 | 1 |
| 77 | 0 | 1 | 1 | 1 | 0 | 1 | 1 | 1 | 0 | 0 |
| 78 | 0 | 1 | 1 | 1 | 1 | 0 | 0 | 0 | 0 | 0 |
| 79 | 0 | 1 | 1 | 1 | 1 | 0 | 0 | 1 | 0 | 0 |
| 7A | 0 | 1 | 1 | 1 | 1 | 0 | 1 | 0 | 1 | 1 |
| 7B | 0 | 1 | 1 | 1 | 1 | 0 | 1 | 1 | 1 | 1 |
| 7C | 0 | 1 | 1 | 1 | 1 | 1 | 0 | 0 | 1 | 1 |
| 7D | 0 | 1 | 1 | 1 | 1 | 1 | 0 | 1 | 1 | 1 |
| 7E | 0 | 1 | 1 | 1 | 1 | 1 | 1 | 0 | 0 | 1 |
| 7F | 0 | 1 | 1 | 1 | 1 | 1 | 1 | 1 | 0 | 0 |

What is claimed is:

1. In a method of processing a raster scan video signal representing an image, said raster scan video signal representing a multiplicity of video image scan lines, the steps of:

encoding said raster scan video signal as a sequence of binary pixel values,
each said binary pixel value representing one pixel of said image, each said video image scan line being encoded as a multiplicity of binary pixels values representing adjacent pixels, said image being represented by a sequence of a multiplicity of encoded video image scan lines; and for each of a plurality of said pixels:
detecting when the binary pixel values representing said pixel and a horizontally adjacent pixel are distinct;
detecting when both (a) the binary pixel values representing said pixel and a vertically adjacent pixel are distinct, and (b) the binary pixel values representing a pixel horizontally adjacent to said pixel and a pixel vertically adjacent thereto are distinct; and
reporting said pixel as an outline pixel when either of said detecting steps detects distinct binary pixel values.

2. A method as set forth in claim 1, wherein said encoding and detecting steps are repeated for every pixel of the video signal except those pixels in the first of said sequence of encoded video image scan lines and the first pixel in each said encoded video image scan line.

3. A method as set forth in claim 1,
wherein each said binary pixel value represents either a light or a dark pixel, and adjacent light and dark pixels represent edge transitions between visually distinct portions of said image;
said first and second detecting means include means for detecting four distinct edge transitions in said image, including horizontal light-to-dark and dark-to-light edge transistions and vertical light-to-dark and dark-to-light edge transitions;
said method further including the step of
selecting which of said four edge transitions to detect; and
wherein said reporting step reports said pixel only when at least one of said selected edge transitions is detected.

4. In a system for processing a raster scan video signal representing an image,
encoding means for encoding a raster scan video signal as a sequence of binary pixel values;
first detecting means for detecting when the binary pixel values representing a selected pixel and a horizontally adjacent pixel are distinct;
second detecting means for detecting when both (a) the binary pixel values representing a selected pixel and a vertically adjacent pixel are distinct, and (b) the binary pixel values representing a pixel horizontally adjacent to said selected pixel and a pixel vertically adjacent thereto are distinct; and
means for reporting said pixel as an outline pixel when either of said detecting means detects distinct binary pixel values.

5. A system as set forth in claim 4,
wherein each said binary pixel value represents either a light or a dark pixel, and adjacent light and dark pixels represent edge transitions between visually distinct portions of said image;
said first and second detecting means include means for detecting four distinct edge transitions in said image, including horizontal light-to-dark and dark-to-light edge transitions and vertical light-to-dark and dark-to-light edge transitions;
said system further including
means for selecting which of said four edge transitions to detect; and
wherein said reporting means reports said selected pixel at least only when one of said selected edge transitions is detected.

6. A system as set forth in claim 4, wherein
said second detecting means includes line buffer means for storing said binary pixel values representing at least one raster scan line.

7. A system as set forth in claim 4, wherein
each edge of a visually distinct portion of said image is represented by horizontally, vertically, or diagonally adjacent pixels having distinct pixel values;

said first and second detecting means include read only memory means for detecting each said edge of a visually distinct portion of said image.

8. A system as set forth in claim 7,
wherein each said binary pixel value represents either a light or a dark pixel, and adjacent light and dark pixels represent edge transitions between visually distinct portions of said image;

said read only memory means includes means for detecting four distinct edge transitions in said image, including horizontal light-to-dark and dark-to-light edge transitions and vertical light-to-dark and dark-to-light edge transitions;

said system further including
means coupled to said read only memory means for selecting which of said four edge transitions to detect;
wherein said reporting means reports said selected pixel only when at least one of said selected edge transitions is detected.

9. In a system for processing a raster scan video signal representing an image, said raster scan video signal representing a multiplicity of video image scan lines,
encoding means for receiving said raster scan video signal and encoding said raster scan video signal as a sequence of quantized pixel values as said video signal is received,
each said quantized pixel value representing one pixel of said image, each said video image scan line being represented by a multiplicity of adjacent pixels, said image being represented by a sequence of a multiplicity of quantized video image scan lines;
buffer means for storing said quantized pixel values for each said video image scan line as the corresponding portion of said video signal is encoded;
first detecting means for detecting, as said video signal is encoded, when the quantized pixel value representing a selected pixel and the quantized pixel value of the previously quantized pixel in the same video image scan line are sufficiently distinct to represent the edge between visually distinct portions of said image;
second detecting means for detecting, as said video signal is encoded, when both (a) the quantized pixel value representing said selected pixel and the quantized pixel value of the adjacent pixel in the previously quantized video image scan line, which was stored in said buffer, are sufficiently distinct to represent the edge between visually distinct portions of said image, and (b) the quantized pixel value representing a pixel adjacent to and in the same video image scan line as said selected pixel and the quantized pixel value of the pixel adjacent thereto in the previously quantized video image scan line, which was stored in said buffer, are sufficiently distinct to represent the edge between visually distinct portions of said image; and
means for reporting said selected pixel as an outline pixel when either of said detecting means detects distinct pixel values.

10. In a method of processing a raster scan video signal representing an image, said raster scan video signal representing a multiplicity of video image scan lines,
the steps of:
receiving said raster scan video signal and encoding said raster scan video signal as a sequence of quantized pixel values as said video signal is received,
each said quantized pixel value representing one pixel of said image, each said video image scan line being represented by a multiplicity of adjacent pixels, said image being represented by a sequence of a multiplicity of quantized video image scan lines; and
for each of a multiplicity of said pixels in a multiplicity of said video image scan lines, detecting the edge between visually distinct portions of said image, by performing the following steps as said video signal is encoded:
detecting when the quantized pixel value representing said pixel and the quantized pixel value of the previously quantized pixel in the same video image scan line are sufficiently distinct to represent the edge between visually distinct portions of said image;
detecting when both (a) the quantized pixel value representing said pixel and the quantized pixel value of the adjacent pixel in the previously quantized video image scan line, which was stored in said buffer, are sufficiently distinct to represent the edge between visually distinct portions of said image, and (b) the quantized pixel value representing a pixel adjacent to and in the same video image scan line as said pixel and the quantized pixel value of the pixel adjacent thereto in the previously quantized video image scan line, which was stored in said buffer, are sufficiently distinct to represent the edge between visually distinct portions of said image; and
reporting said pixel as an outline pixel when either of said detecting steps detects distinct pixel values.

11. The method of claim 10, including the steps of:
providing a buffer for storing said quantized pixel values; and
storing in said buffer said quantized pixel values for each said video image scan line as the corresponding portion of said video signal is encoded.

12. In a system for processing a raster scan video signal representing an image, said raster scan video signal representing a multiplicity of video image scan lines,
encoding means for receiving said raster scan video signal and encoding said raster scan video signal as a sequence of binary pixel values as said video signal is received,
each said binary pixel value representing one pixel of said image, each said video image scan line being encoded as a multiplicity of binary pixels values representing adjacent pixels, said image being represented by a sequence of a multiplicity of encoded video image scan lines;
buffer means for storing said binary pixel values for each said video image scan line as the corresponding portion of said video signal is encoded;
first detecting means for detecting, as said video signal is encoded, when the binary pixel value representing a selected pixel and the binary pixel value of the previous pixel in the same video image scan line are distinct;
second detecting means for detecting, as said video signal is encoded, when both (a) the binary pixel value representing said selected pixel and the binary pixel value of the adjacent pixel in the previous video image scan line, which was stored in said buffer, are distinct, and (b) the binary pixel value representing a pixel adjacent to and in the same video image scan line as said selected pixel and the binary pixel value of the pixel adjacent thereto in the previous video image scan line, which was stored in said buffer, are distinct; and means for reporting said selected pixel as an outline pixel when either of said detecting means detects distinct pixel values.

13. In a method of processing a raster scan video signal representing an image, said raster scan video signal representing a multiplicity of video image scan lines, the steps of:

receiving said raster scan video signal and encoding said raster scan video signal as a sequence of binary pixel values as said video signal is received, each said binary pixel value representing one pixel of said image, each said video image scan line being encoded as a multiplicity of binary pixels values representing adjacent pixels, said image being represented by a sequence of a multiplicity of encoded video image scan lines;

for each of a multiplicity of said pixels in a multiplicity of said video image scan lines, detecting the edge between visually distinct portions of said image, by performing the following steps as said video signal is encoded;

detecting when the binary pixel value representing said pixel and the binary pixel value of the previous pixel in the same video image scan line are distinct;

detecting when both (a) the binary pixel value representing said pixel and the binary pixel value of the adjacent pixel in the previous video image scan line are distinct, and (b) the binary pixel value representing a pixel adjacent to and in the same video image scan line as said pixel and the binary pixel value of the pixel adjacent thereto in the previous video image scan line are distinct; and reporting said pixel as an outline pixel when either of said detecting steps detects distinct pixel values.

14. The method of claim 13, including the steps of:

providing a buffer for storing said binary pixel values; and storing said binary pixel values for each said video image scan line substantially immediately after said step of encoding the corresponding portion of said raster scan video signal.

15. In a system for processing a raster scan video signal representing an image, said raster scan video signal representing a multiplicity of video image scan lines, encoding means for encoding a raster scan video signal as a sequence of binary pixel values, each said binary pixel value representing one pixel of said image, each said video image scan line being encoded as a multiplicity of binary pixels values representing adjacent pixels, said image being represented by a sequence of a multiplicity of encoded video image scan lines;

buffer means for storing said binary pixel values for at least one video image scan line;

read only memory means having at least four address input signals, including first table means for generating a report signal:

(1) when the binary pixel value representing a selected pixel and the binary pixel value of the previous pixel in the same video image scan line are distinct; and (2) when both (a) the binary pixel value representing said selected pixel and the binary pixel value of the adjacent pixel in the previous video image scan line are distinct, and (b) the binary pixel value representing a pixel adjacent to and in the same video image scan line as said pixel and the binary pixel value of the pixel adjacent thereto in the previous video image scan line are distinct; and second table means for generating a horizontal take signal when the binary pixel value representing said selected pixel and the binary pixel value of the adjacent pixel in the previous video image scan line are distinct;

said address input signals for said read only memory means including the binary pixel value of said selected pixel, the binary pixel value of the previous pixel in the same video image scan line as said selected pixel, the binary pixel value of the pixel adjacent to said selected pixel in the video image scan line previous to the video image scan line containing said selected pixel, and said horizontal take signal generated by said second table means for the previous pixel in the same video image scan line as said selected pixel.

16. In the system of claim 15, wherein each said binary pixel value represents either a light or a dark pixel, and adjacent light and dark pixels represent edge transitions between visually distinct portions of said image; said edge transitions including four distinct types of edge transitions: horizontal light-to-dark, and horizontal dark-to-light, vertical light-to-dark and vertical dark-to-light edge transitions;

said system further including means for selectively enabling the detection of said four types of edge transitions, including means for generating four separate binary address input signals for said read only memory, each address input signal having a value corresponding to whether the detection of a corresponding one of said edge transitions has been enabled;

wherein said first table means of said read only memory detects only selected edge transitions in said image.

* * * * *